United States Patent
Coxey

(10) Patent No.: US 10,357,025 B2
(45) Date of Patent: Jul. 23, 2019

(54) SPINNING FISHING LURE WITH BEAD ELEMENTS WITH AUDITORY ATTRACTANT CHARACTERISTICS

(71) Applicant: Robert Coxey, Jacksonville, FL (US)

(72) Inventor: Robert Coxey, Jacksonville, FL (US)

( * ) Notice: Subject to any disclaimer, the term of this patent is extended or adjusted under 35 U.S.C. 154(b) by 0 days.

(21) Appl. No.: 16/156,823

(22) Filed: Oct. 10, 2018

(65) Prior Publication Data
US 2019/0104711 A1  Apr. 11, 2019

Related U.S. Application Data

(60) Provisional application No. 62/570,513, filed on Oct. 10, 2017.

(51) Int. Cl.
| A01K 85/10 | (2006.01) |
| A01K 85/01 | (2006.01) |
| A01K 95/02 | (2006.01) |

(52) U.S. Cl.
CPC ............ *A01K 85/01* (2013.01); *A01K 85/10* (2013.01); *A01K 95/02* (2013.01)

(58) Field of Classification Search
CPC ........................................... A01K 85/10
USPC ........................................ 43/42.13
See application file for complete search history.

(56) References Cited

U.S. PATENT DOCUMENTS

| | | | | |
|---|---|---|---|---|
| 1,600,618 A * | 9/1926 | Bentley | .................. | A01K 85/02 43/36 |
| 1,636,904 A * | 7/1927 | Elwood | .................. | A01K 85/10 43/42.33 |
| 1,698,193 A * | 1/1929 | Geer | .................. | A01K 85/10 24/598.1 |
| 1,867,555 A * | 7/1932 | Hildebrandt | .................. | A01K 85/10 24/600.6 |
| 2,131,858 A * | 10/1938 | Ledrich | .................. | A01K 85/10 43/42.19 |
| 2,212,294 A * | 8/1940 | Larzelere | .................. | A01K 85/10 43/42.14 |
| 2,674,823 A * | 4/1954 | Gellings | .................. | A01K 85/10 43/42.19 |
| 2,823,484 A * | 2/1958 | Bousquet | .................. | A01K 85/10 43/42.19 |
| 4,730,410 A * | 3/1988 | Sobieniak | .................. | A01K 85/10 43/42.17 |
| 4,888,909 A * | 12/1989 | Adams | .................. | A01K 85/10 43/42.16 |
| 5,113,606 A * | 5/1992 | Rinker | .................. | A01K 85/10 43/42.06 |
| 5,605,004 A * | 2/1997 | Boullt | .................. | A01K 85/00 43/42.13 |
| 5,647,163 A * | 7/1997 | Gorney | .................. | A01K 85/00 43/42.13 |
| 5,887,379 A * | 3/1999 | Lockhart | .................. | A01K 85/00 43/42.13 |

(Continued)

*Primary Examiner* — Christopher P Ellis
(74) *Attorney, Agent, or Firm* — Joseph P. Kincart; Rogers Towers, P.A.

(57) ABSTRACT

Methods and apparatus for the creation of novel fishing lures is provided. In some examples. In some examples, the lure comprises a body wire including attachment features which may be reversibly attached to the lure. In some examples, the device may have the ability to comprise moving parts on its body which can be attractive to fish. In some examples the fishing lure comprises multiple moving parts that can create visual and sound based attractive aspects.

20 Claims, 5 Drawing Sheets

(56) References Cited

U.S. PATENT DOCUMENTS

| | | | | |
|---|---|---|---|---|
| 6,158,162 A * | 12/2000 | Loniello | ................ | A01K 85/00 43/42.11 |
| 7,467,491 B1 * | 12/2008 | Slocum | ................ | A01K 85/00 43/42.13 |
| 8,042,298 B1 * | 10/2011 | Yonekura | ............... | A01K 85/00 43/42.13 |
| 2002/0148155 A1 * | 10/2002 | Pasley | ................... | A01K 85/10 43/42.49 |
| 2003/0145510 A1 * | 8/2003 | Kohigashi | .............. | A01K 85/00 43/42.13 |
| 2004/0079022 A1 * | 4/2004 | Owen | ................... | A01K 85/10 43/42.09 |
| 2006/0000138 A1 * | 1/2006 | Druk | ...................... | A01K 85/01 43/42.09 |
| 2006/0242887 A1 * | 11/2006 | Toman | .................. | A01K 85/10 43/42.19 |
| 2009/0211144 A1 * | 8/2009 | Murphy | ................ | A01K 85/00 43/42.19 |
| 2010/0263258 A1 * | 10/2010 | Hinz | ...................... | A01K 85/00 43/42.13 |
| 2010/0281756 A1 * | 11/2010 | Lau | ....................... | A01K 85/00 43/42.13 |
| 2011/0119985 A1 * | 5/2011 | Siler | ..................... | A01K 85/10 43/42.2 |
| 2011/0247260 A1 * | 10/2011 | Schwartz | .............. | A01K 85/01 43/42.31 |
| 2017/0347635 A1 * | 12/2017 | Sandefur | ................ | A01K 85/02 |

* cited by examiner

SPINNING FISHING LURE WITH BEAD ELEMENTS WITH AUDITORY ATTRACTANT CHARACTERISTICS

FIELD OF THE DISCLOSURE

The present disclosure relates to an apparatus for a spinning fishing lure with bead elements with auditory attractant characteristics.

BACKGROUND OF THE DISCLOSURE

Fishing is enjoyed around the world as a source of food, sport, and recreation. An ability to configure a fishing lure to attract fish to a hook without bait can provide an economical and easy solution when preparing to fish. Certain types of lures can work better at different locations or different times, but most lures have certain common aspects. In particular, it is desirable that a lure is reusable and stable so that the lure does not have to be adjusted after each casting. A common desirable aspect is that the device have the ability to comprise moving parts on its body which can be attractive to fish. It may be desirable to design a fishing lure with multiple moving parts that can create visual and sound based attractive aspects in such a manner that is stable for a user.

SUMMARY OF THE DISCLOSURE

Accordingly, the present invention provides novel designs for fishing lures with multiple moving parts capable of creating attractive visual and vibrational effect during its operation.

One general aspect includes a fishing tackle lure assembly including: a body wire, where the body wire may be bent to form at least a first point of attachment. The fishing tackle lure assembly also includes a first attachment point, where the first attachment point is configured to reversibly receive a first attachment element. The fishing tackle lure assembly also includes a looping kink, where the looping kink holds a first portion of the body wire and a second portion of the body wire at a first separation angle. The fishing tackle lure assembly also includes a bottom loop, where the bottom loop is configured to reversibly receive a second attachment element. The fishing tackle lure assembly also includes at least a first bead hardware and a second bead hardware, where the first bead hardware and the second bead hardware include a through hole, where the first bead hardware and the second bead hardware are strung through the body wire, and where the first bead hardware and the second bead hardware are positioned such that they may move upon the body wire and intermittently contact each other. The fishing tackle lure assembly also includes a clevis, where the clevis is mounted upon the body wire and is free to rotate about a central axis of the body wire, and where the clevis is configured to reversibly receive a third attachment element.

Implementations may include one or more of the following features: The fishing tackle lure assembly may further include the first attachment element where the first attachment element is a fishing hook. The fishing tackle lure assembly may also include the second attachment element, where the second attachment element is a spinner. The fishing tackle lure assembly may also include the third attachment element, where the third attachment element is a spinner. The fishing tackle lure assembly may be such that the first separation angle is larger than or equal to an angle which holds the third attachment element away from contact with the first portion of the body wire. The fishing tackle lure assembly is also disclosed where the first bead hardware and the second bead hardware vibrate back and forth upon each other while the fishing tackle lure assembly moves through a body of water. Additionally, one or more of the second attachment element and the third attachment element may be a willow blade spinner. The fishing tackle lure assembly is further disclosed where one or more of the second attachment element and the third attachment element is a Colorado spinner. The fishing tackle lure assembly is further disclosed where one or more of the first bead hardware and the second bead hardware include reflective regions, colored regions and surface texture comparable to a fishing bait. The fishing tackle lure assembly is additionally disclosed where the first attachment element has a fixed weight.

One general aspect includes a fishing tackle lure assembly including: a body wire, where the body wire may be bent to form at least a first point of attachment. The fishing tackle lure assembly may also include a permanent attachment point, where the permanent attachment point is attached to a fishing hook. The fishing tackle lure assembly may also include a looping kink, where the looping kink holds a first portion of the body wire and a second portion of the body wire at a first separation angle. The fishing tackle lure assembly may also include a bottom loop, where the bottom loop is configured to reversibly receive a second attachment element. The fishing tackle lure assembly may also include at least a first bead hardware and a second bead hardware, where the first bead hardware and the second bead hardware include a through hole, where the first bead hardware and the second bead hardware are strung upon the body wire, where the first bead hardware and the second bead hardware are positioned such that they may move upon the body wire and intermittently contact each other. Additionally, the fishing tackle lure assembly can also include a clevis, where the clevis is mounted upon the body wire and is free to rotate about a central axis of the body wire, and where the clevis is configured to reversibly receive a third attachment element.

Implementations may include one or more of the following features: The fishing tackle lure assembly further including the second attachment element where the second attachment element is a fixed weight. The fishing tackle lure assembly further including the second attachment element, where the second attachment element is a spinner. The fishing tackle lure assembly further including the third attachment element, where the third attachment element is a spinner. The fishing tackle lure assembly where the first separation angle is larger than or equal to an angle which holds the third attachment element away from contact with the first portion of the body wire. The fishing tackle lure assembly where the first bead hardware and the second bead hardware vibrate back and forth upon each other while the fishing tackle lure assembly moves through a body of water. The fishing tackle lure assembly where one or more of the second attachment element and the third attachment element is a willow blade spinner. The fishing tackle lure assembly where one or more of the second attachment element and the third attachment element is a Colorado spinner. The fishing tackle lure assembly where one or more of the first bead hardware and the second bead hardware include reflective regions, colored regions and surface texture comparable to a fishing bait.

One general aspect includes a method of forming a fishing tackle lure, the method including: obtaining a first body wire, where the first body wire may be bent into one or more permanently shaped features without breaking; bending a terminal portion of the first body wire into a loop, where the loop includes a bottom loop; placing at least a first bead hardware and a second bead hardware upon the first body wire, where a through hole in the first bead hardware and in the second bead hardware is threaded upon the first body wire; threading a clevis upon the first body wire, where the clevis includes a through hole through which the first body wire is threaded; bending the first body wire into loop, where the loop includes more than 360 degrees of bend to form a looping kink, where the kinking loop separates the first body wire into a first portion of the first body wire and a second portion of the first body wire; and bending a region of a terminus of the first portion of the first body wire to form an attachment point, where a first attachment element may be reversibly attached to the attachment point.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

DETAILED DESCRIPTION

The present disclosure provides generally for apparatus for novel fishing lures. According to the present disclosure, the use of multiple fishing lure elements that provide visual and vibrational stimulus to attract fish to the lure may provide a novel improvement on a conventional reusable fishing lure. In some examples, two flashy or otherwise visually attractive spinners or spoons may be fashioned upon various designs of lures. The lures may further comprise beads or other devices that while moving through water create vibrations and associated sound waves to attract fish.

In the following sections, detailed descriptions of examples and methods of the disclosure will be given. The description of both preferred and alternative examples though through are exemplary only, and it is understood that to those skilled in the art that variations, modifications, and alterations may be apparent. It is therefore to be understood that the examples do not limit the broadness of the aspects of the underlying disclosure as defined by the claims.

Fishing Lures with Multiple Elements

A lure may be a vital piece of tackle to catch certain types of fish; the purpose of a lure is to attract a fish to the hook. More specifically, certain types of lures excel at getting the attention of and attracting fish from far distances, where an enticing piece of bait (food for the fish such as crawfish, as a nonlimiting example) seals the deal in getting the fish to bite the hook; alternatively, the lure may be made to closely resemble a food that would entice the desired fish, attracting them in close and then getting them to bite the attached hook. The latter of these common lure types may be preferred for many reasons, including reusability that minimizes the cost of ownership of the lure.

Lures may have many different characteristics that are important to attracting fish, including but not limited to being shiny, moving in certain patterns through the water, vibrating with the movement of the water, resting at certain depths, making sounds that the fish can hear, and possibly many other characteristics about commercially made lures that humans may not realize are important to attract the fish. Spinners are commonly used on lures, as they may achieve multiple of the aforementioned attracting characteristics, while spinning through the water at certain speeds that make the lure look like live bait to a fish. Even with this movement, it is important that the spinners do not get tangled up in the rest of the lure or the tackle, which may leave the tackle unable to hook and reel in a fish. No lure to date may be considered perfect at getting all of the desired fish to come to and bite the hook, so fishermen are constantly innovating the hardware to improve its attracting capabilities, to satisfy more fishermen and make the sport more enjoyable.

Figure 1A:
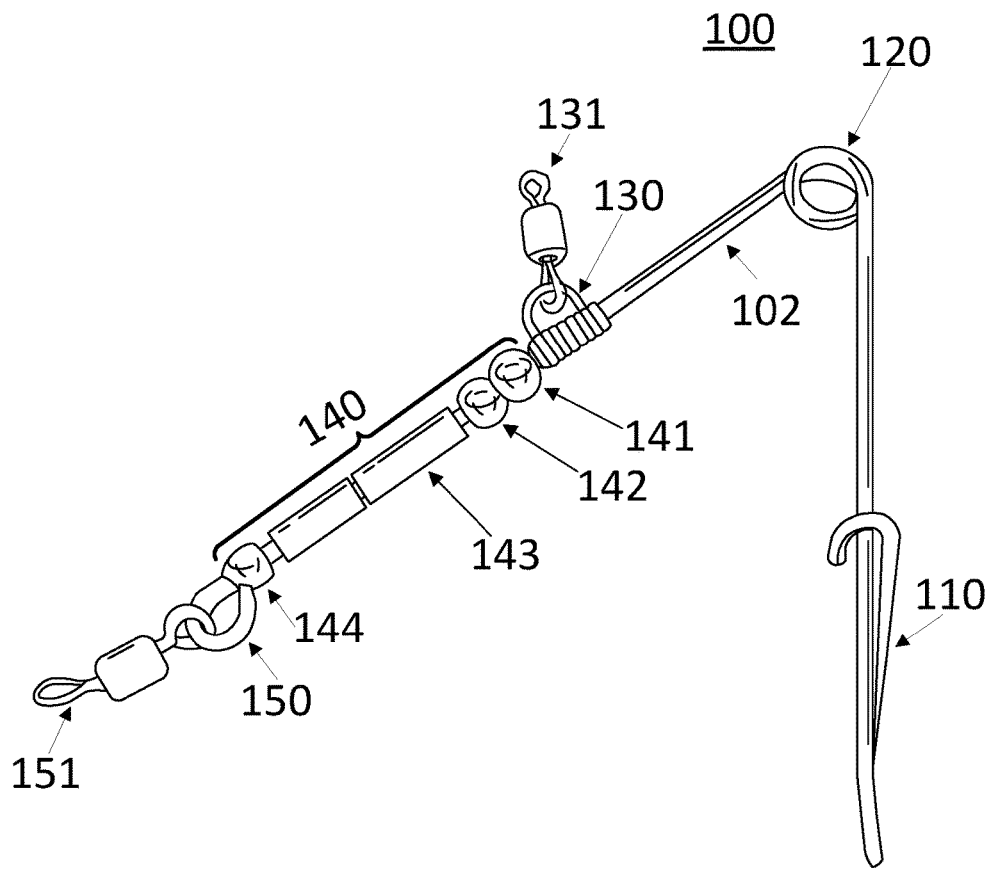
FIG. 1A illustrates an exemplary spinning fishing lure with exchangeable hook.
Figure 1B:
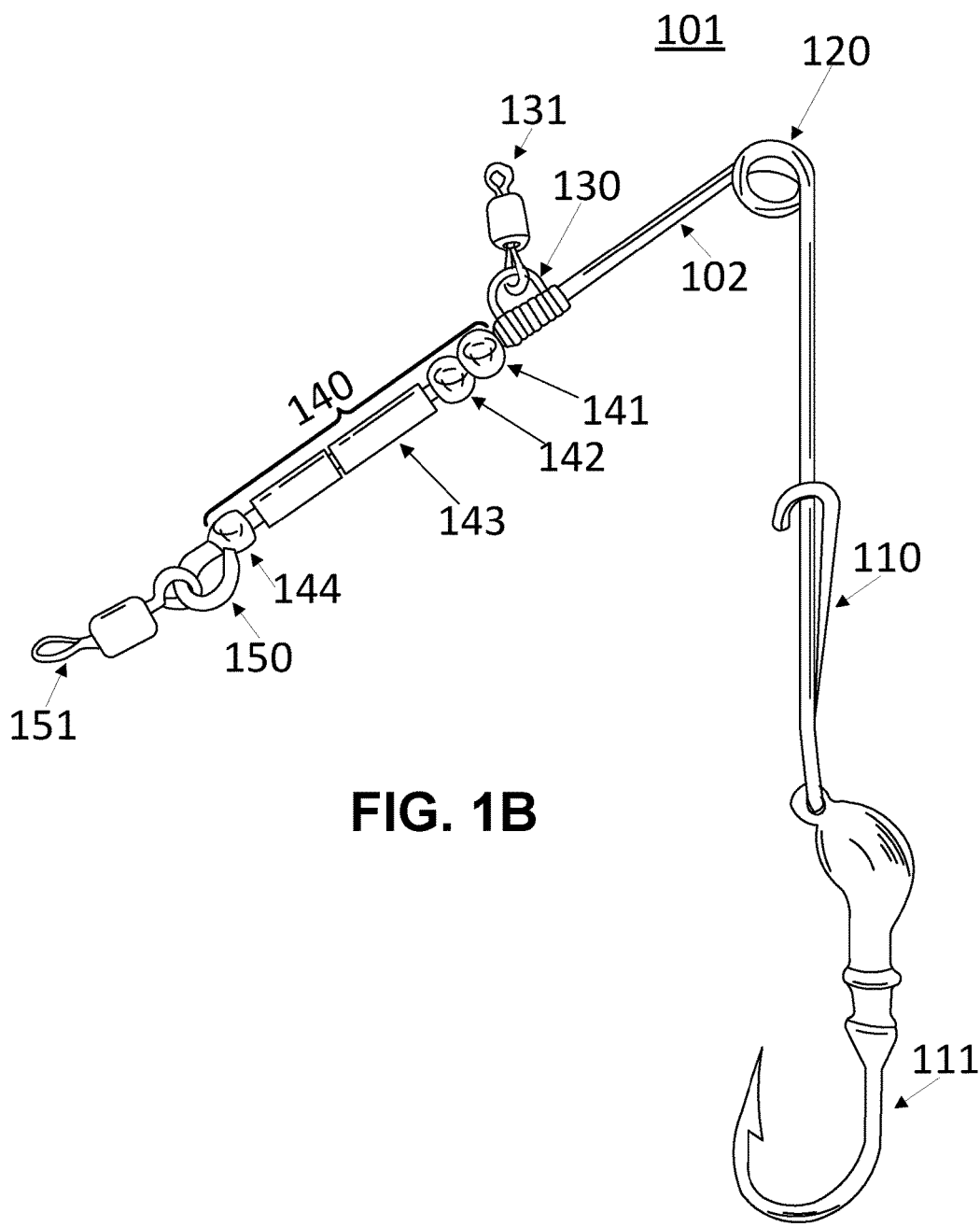
FIG. 1B illustrates an exemplary spinning fishing lure with attached hook.

Referring now to FIGS. 1A and 1B, two possible embodiments of an exemplary spinning fishing lure may be seen. The first, seen in FIG. 1A encompasses a spinning fishing lure with exchangeable hook 100; the second, seen in FIG. 1B, encompasses a spinning fishing lure with attached hook 101. These two embodiments may be seen as non-limiting examples.

Still referring to FIGS. 1A and 1B, hooks may be attached to the spinning fishing lure with exchangeable hook 100 via a latching attachment point 110. The latching attachment point 110 may consist of a bent section of the constituent wire 102 that may make up the body of the lure; the shape of the bending may allow spring action of the latching attachment point 110 to lock in place, securing the attached hook to the body of the lure, or to separate the section of constituent wire 102 from the main body of the lure, allowing for the attached hook to be removed. This latching attachment point 110 may also serve as an attachment point for fixed weights, which may be desirable for bass fishing, or other possible fishing hardware. Alternatively, for the spinning fishing lure with attached hook 101, the hook 111 may be attached directly to the body of the fishing lure through various possible means. This attached hook may come with synthetic fish bait, frills, or other features that may be desired to be rigidly affixed to the body of the fishing lure.

Still referring to FIGS. 1A and 1B, a looping kink 120 may be seen at the top of the body of the fishing lure. The looping kink 120 may be formed by bending the constituent wire 102, which is the main body of the fishing lure, into a closed loop. The angle of the looping kink 120 may be determined as an angle that may hold the attached spinners out of the way of the hook, to prevent tangling of any of the hardware affixed to the fishing lure, while still holding the attached spinners as close to the hook as possible, which may increase the chances of fish biting the hook, as is desired.

Still referring to FIGS. 1A and 1B, an attached clevis 130 may be seen. The clevis 130 may be attached to the constituent wire 102, above the bead hardware 140. A spinner may be attached to the clevis 130. In some embodiments, this attachment is achieved using an upper swivel 131. The clevis 130 may be free to rotate about the central axis of the constituent wire 102, which may rotate the attached spinner in this motion. The nearby bead hardware 140, may also take an important role in baiting fish with the lure. Two upper beads 141, 142 may be located above a spacer 143, which in turn may be located above a lower bead 144. Each of the aforementioned pieces of bead hardware 140 may have bores along their central axes; these bores may serve as a threading point for the wire that makes up the body of the lure, which may align the pieces of bead hardware to the central axis of the wire that makes up the body of the fishing lure, yet may allow them to move up and down the shaft they may be located on. The bead hardware 140 is made of materials sufficiently hard to produce loud noises upon collision, such as hard metal or plastic. Each respective piece of bead hardware 140 may be made of the same or different material. As the fishing lure moves through the water, vibrations may move these pieces of bead hardware 140 up and down the shaft they are located on; in turn, the two upper beads 141, 142, the upper bead and the spacer, 142, 143, and the lower bead and the spacer 144, 143, may collide with each other, which may produce a clicking sound or vibrational energy which may be detected by fish. Depending on the rhythm and volume of this clicking sound in the water, it may serve to attract nearby fish to the lure. Below the bead hardware 140 a bottom loop 150 may be seen. This bottom loop 150 may serve as a point to affix a spinner or other hardware. In some embodiments, this affixation is achieved using a lower swivel 151.

Figure 1C:
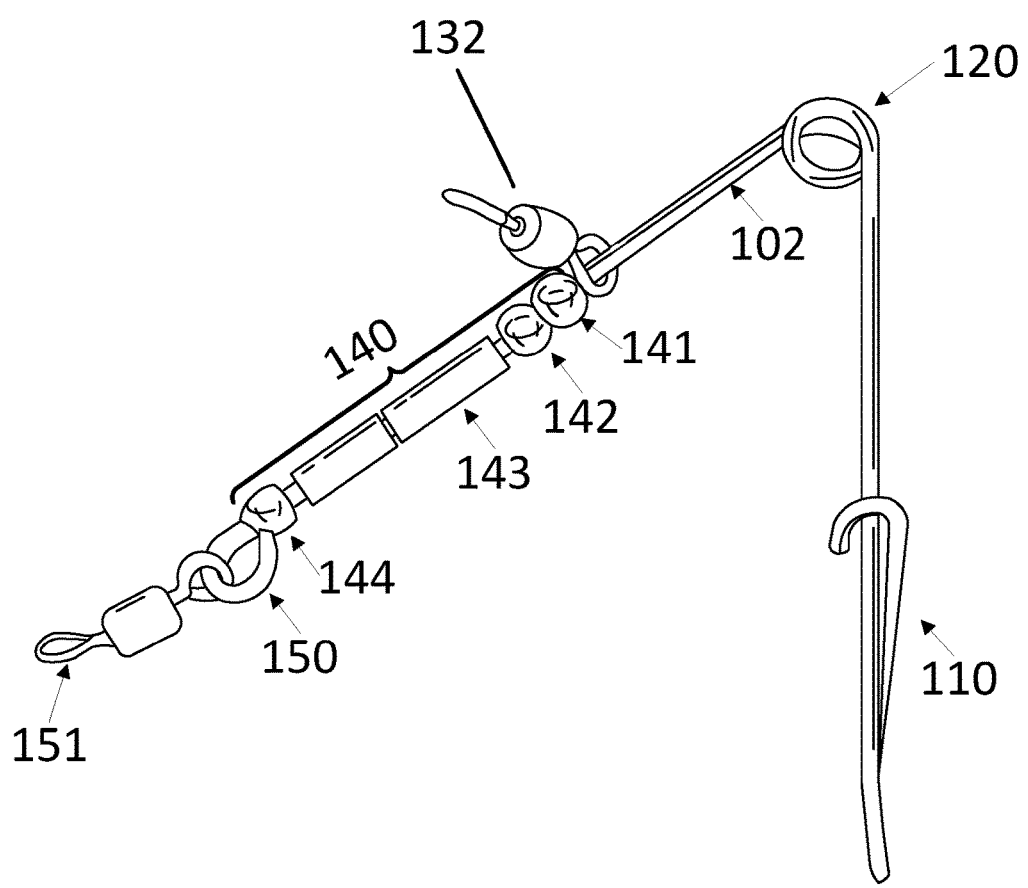
FIG. 1C illustrates an exemplary spinning fishing lure with exchangeable hook and independent clevis.

Referring now to FIG. 1C, in some embodiments of the invention described above and depicted in FIGS. 1A-1C, the clevis 130 may be replaced by upper independent swivel 132. A swivel is a small device comprising two rings connected to a pivoting joint. Any of the three swivels described herein—upper independent swivel 132, upper swivel 131, or lower swivel 151—may be made of metal. In some embodiments, one or more of the swivels may be ball- or barrel-shaped. Replacing clevis 130 with upper independent swivel 132 may be desirable to save resources in assembling the spinning fishing lure with exchangeable hook 100 or the spinning fishing lure with attached hook 101.

Figure 2A:
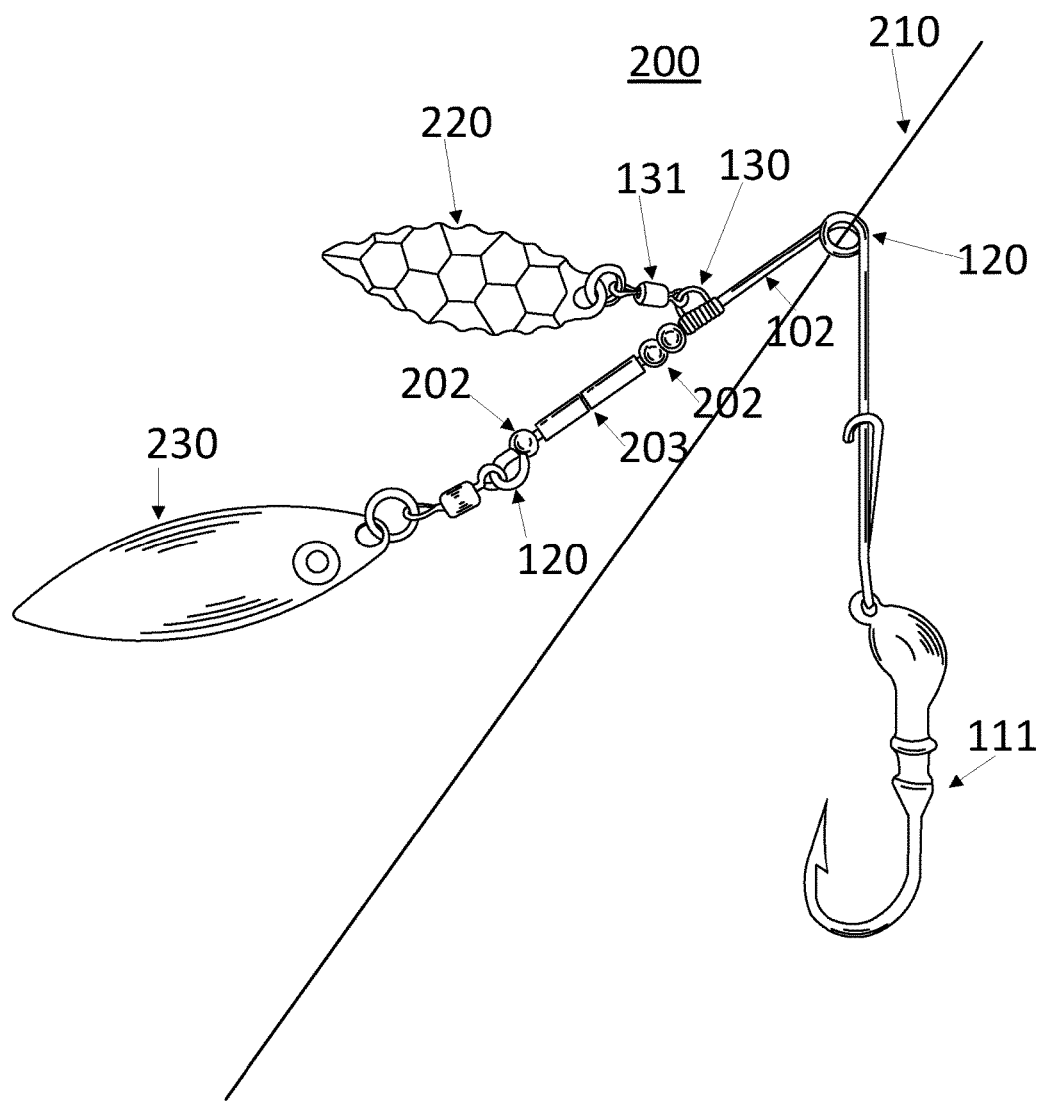
FIG. 2A illustrates an exemplary fully assembled arrangement of a spinning fishing lure with exchangeable hook.
Figure 2B:
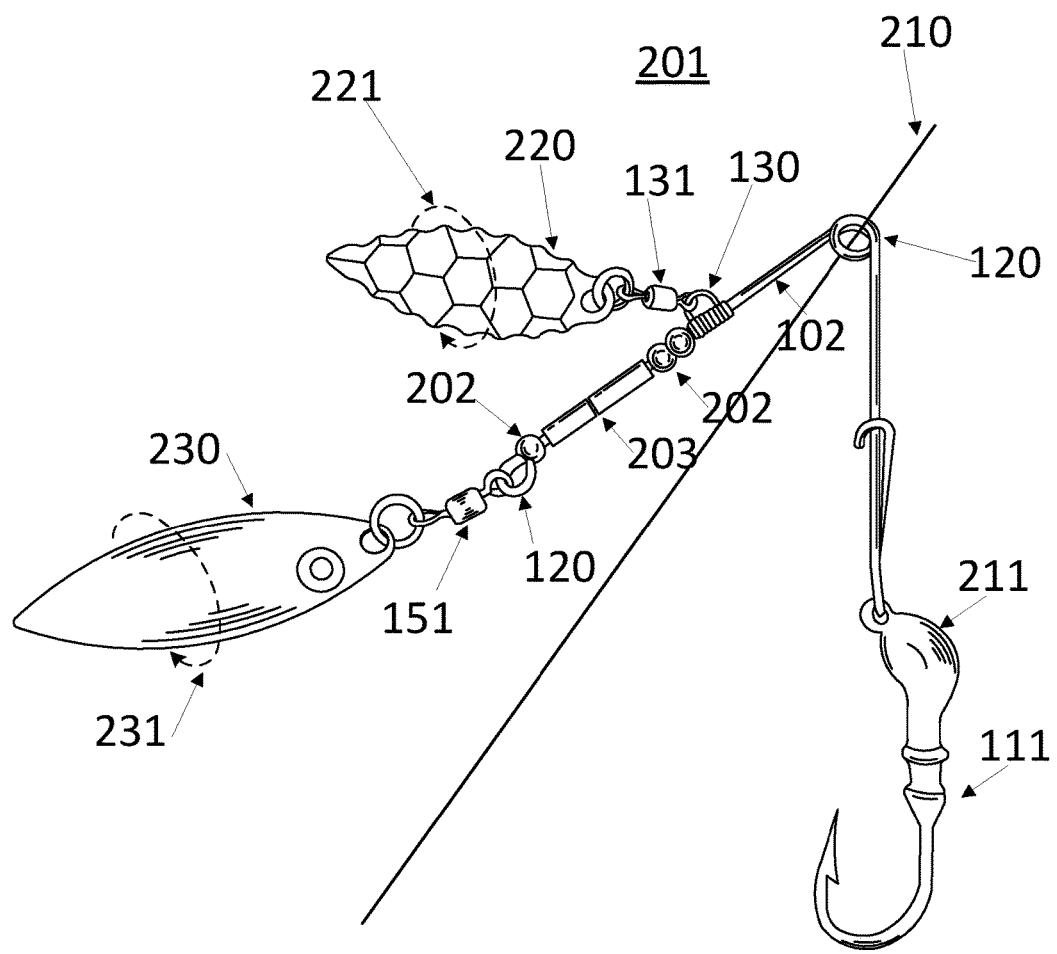
FIG. 2B illustrates an exemplary fully assembled arrangement of a spinning fishing lure with attached hook.

Referring now to FIGS. 2A and 2B, exemplary fully assembled arrangements of a spinning fishing lure with exchangeable hook 200 and a spinning fishing lure with attached hook 201 may be seen. Both exemplary fully assembled arrangements comprise tied to a main fishing line 210 via the looping kink 120. Additionally, each may comprise an upper spinner 220 attached to the upper swivel 131, and a lower spinner 230 attached to the lower swivel 151.

Multiple types of spinners may be used in this arrangement, including but not limited to a spoon, a willow blade spinner, with a characteristic 30-degree lift, or a Colorado spinner, with a characteristic 60-degree lift, as non-limiting examples. The angle mentioned, with regards to typical spinners, relates to the angle between the sides of the spinner, where the spinner is affixed to a lure; the larger the angle, the more lift its movement through the water generates, and thus the slower it spins.

In some embodiments an upper spinner 220 may include a Willow Blade attached to a clevis pin 130 thereby rotatably securing the Willow Blade to a shaft 204 formed of body wire. A lower spinner 230 may be included on the same constituent wire 102 and in some embodiment be located at a distal end of the body wire forming the constituent wire 102. The present invention thereby includes two spinners 220 and 230 that spin on a same axis, formed by constituent wire 102.

In another aspect, embodiments may include two or more beads consecutively loosely arranged on the constituent wire 102 such that the beads may "click" when moved through water thereby striking each other and creating a unique sound pattern. Other aspects include a bead 202 positioned on the constituent wire 102 adjacent to a spacer 203 such that another unique sound is created when the bead 202 and the spacer 203 bump against each other.

A clevis 130 allows the upper spinner 220 to completely rotate around the shaft 204. In some embodiments, the clevis 130 may be located in a position generally about half way up the length of the constituent wire 102, wherein a distal end of the shaft 204 includes a lower spinner 230 and proximate end of the constituent wire 102 may include a looping kink 120. The upper spinner 220 may spin around the constituent wire 102 but will generally avoid snags by turning freely into a position for horizontal rotation.

Arrangements of upper spinner 220 and lower spinner 230 may be arranged according to the spinner blade type and size. For example, a Colorado blade may be used at the distal end of the constituent wire 102 to cause the assembly to travel at a shallow depth. A Willow blade will cause the assembly to run deeper; two Willow blades run even deeper. A smaller Colorado blade will cause also the assembly to run deeper, while a larger Willow blade will cause the assembly to run shallower.

In some preferred embodiments, a shaft of total length of about six inches is formed to allow for two spinners 220 and 230 with an upper spinner 220 positioned proximate to a jig head 211 which may be a hook and typically just ahead of the hook comprising the jig head 211. A lower spinner 230 may be positioned beyond the jig head 211. In this embodiment, both spinners 220 and 230 attract fish towards the jig head 211. Essentially, the purpose of the placement of spinners 220 and 230 near the hook is to place the shiny parts near the sharp parts.

The spinner may have certain reflective, color, and texture properties that when spinning, replicate the look and movement of a fish's food; this may attract the fish to the lure, and entice it to bite the jig head 211.

Referring now to FIG. 2B, in some embodiments, the spinners 220 and 230 will rotate through an arc of rotation, 221 and 231, respectively. An arc of rotation may be between about 30 degrees and 60 degrees. By way of example, a Willow blade may be sized and shaped to rotate through about a 30 degree arc and a Colorado will rotate through about a 60 degree arc.

In some embodiments, a lower spinner 230 may be suspended from the constituent wire 102 via a lower swivel 151. Additionally, in some embodiments, jig head 211 is exchangeable via a clasp.

CONCLUSION

A number of embodiments of the present disclosure have been described. While this specification contains many specific implementation details, there should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

In certain implementations, multitasking and parallel processing may be advantageous. Nevertheless, it will be understood that various modifications may be made without departing from the spirit and scope of the claimed disclosure.

What is claimed is:

1. A fishing tackle lure assembly comprising:
    a body wire bent to form a spring action latching attachment point securing a first attachment element attached at the attachment point in the body wire;
    a looping kink in the body wire comprising a closed loop of 360 degrees or more of wire and suitable for tying a fishing line to;
    a first portion of the body wire comprising the spring action latching point separated from a second portion of the body wire at a separation angle via the looping kink, the separation angle sufficient to prevent a spinner attached to a second loop from tangling with the first attachment element;
    a bottom loop in the body wire reversibly receiving a second attachment element;
    a bead hardware comprising a plurality of beads and a plurality of spacers, each having a bore;
    wherein said body wire is received within said bores to movably position said beads and said spacers upon the body wire to intermittently contact each other; and
    a clevis mounted upon the body wire between the first bead and the looping kink and rotatable about a central axis of the body wire and reversibly securing a swivel attached to a third attachment element in a manner that allows the third element and the swivel to rotate about the axis of the wire as the clevis rotates and also allows the third element to spin about an axis of the swivel.

2. The fishing tackle lure assembly of claim 1 wherein the first attachment element is a fishing hook.

3. The fishing tackle lure assembly of claim 1 wherein the first attachment element is a fixed weight.

4. The fishing tackle lure assembly of claim 2 wherein the second attachment element is a spinner.

5. The fishing tackle lure assembly of claim 2 wherein the third attachment element is a spinner.

6. The fishing tackle lure assembly of claim 5 wherein the separation angle is larger than or equal to an angle which holds the third attachment element away from contact with the first portion of the body wire.

7. The fishing tackle lure assembly of claim 6 wherein the first bead and the second bead vibrate back and forth upon each other while the fishing tackle lure assembly moves through a body of water.

8. The fishing tackle lure assembly of claim 7 wherein one or more of the second attachment element and the third attachment element is a willow blade spinner.

9. The fishing tackle lure assembly of claim 7 wherein one or more of the second attachment element and the third attachment element is a Colorado spinner.

10. The fishing tackle lure assembly of claim 7 wherein one or more of the first bead hardware and the second bead hardware comprise reflective regions, colored regions and surface texture comparable to a fishing bait.

11. The fishing tackle lure assembly of claim 1 wherein the second attachment element is a fixed weight.

12. The fishing tackle lure assembly of claim 1 wherein the second attachment element is a willow spinner blade with a 30-degree lift.

13. The fishing tackle lure assembly of claim 1 wherein the third attachment element is a Colorado spinner with a 60-degree lift.

14. The fishing tackle lure assembly of claim 2 wherein one or both of the second attachment element and the third attachment element is a willow blade spinner.

15. The fishing tackle lure assembly of claim 2 wherein one or more of the second attachment element and the third attachment element comprises a Colorado spinner.

16. The fishing tackle lure assembly of claim 14 wherein one or more of the first bead hardware and the second bead hardware comprise reflective regions, colored regions and surface texture comparable to a fishing bait.

17. A method of forming a fishing tackle lure, the method comprising:
   bending a terminal portion of a body wire into a loop comprising a bottom loop;
   attaching a first swivel to the bottom loop;
   attaching a first spinner to the first swivel in a manner allowing the first spinner to rotate about an axis of the body wire;
   threading the body wire through a bore hole in a first bead and a second bead;
   threading the body wire through a clevis rotatable about the axis of the body wire;
   attaching a second swivel to the clevis in a manner allowing the second swivel to rotate about the axis of the body wire with the clevis;
   attaching a second spinner to the second swivel in a manner allowing the second spinner to rotate about an axis of the second swivel and also rotate about the axis of the body wire with the clevis and the swivel;
   bending the body wire into a looped kink, comprising more than 360 degrees of bend in the body wire, the kinking loop separating the body wire into a first portion of the body wire and a second portion of the body wire;
   bending a region of a terminus of the body wire to form an attachment point; and
   attaching a hook to the attachment point.

18. The method of claim 17 wherein the hook comprises a weighted hook.

19. The method of claim 18 wherein the second spinner comprises Colorado spinner with a 60-degree lift.

20. The method of claim 18 wherein the second spinner comprises a willow spinner blade with a 30-degree lift.

* * * * *